United States Patent [19]
Tanaka et al.

[11] Patent Number: 6,076,164
[45] Date of Patent: Jun. 13, 2000

[54] AUTHENTICATION METHOD AND SYSTEM USING IC CARD

[75] Inventors: Toshiaki Tanaka; Satoshi Hada; Mitsuru Yamada, all of Tokyo, Japan

[73] Assignee: Kokusai Denshin Denwa Co., Ltd., Tokyo, Japan

[21] Appl. No.: 08/921,249

[22] Filed: Aug. 29, 1997

[30] Foreign Application Priority Data

Sep. 3, 1996 [JP] Japan .................................. 8-250816

[51] Int. Cl.$^7$ ........................................................ H04K 1/00
[52] U.S. Cl. ........................ 713/185; 713/155; 713/171
[58] Field of Search ...................... 380/25, 23; 713/201, 713/200, 185, 155, 159, 171, 172

[56] References Cited

U.S. PATENT DOCUMENTS

| | | | |
|---|---|---|---|
| 5,657,388 | 8/1997 | Weiss | 380/23 |
| 5,717,756 | 2/1998 | Coleman | 380/25 |
| 5,784,704 | 7/1998 | Sanemitsu | 711/164 |

*Primary Examiner*—Gail O. Hayes
*Assistant Examiner*—Ho S. Song
*Attorney, Agent, or Firm*—Armstrong, Westerman, Hattorri, McLeland & Naughton

[57] ABSTRACT

A method and system for authenticating between a user or client and a network access entity such as a server or another client using an IC card. The method includes a step of executing an initial authentication using the IC card when the user first communicates with the network access entity, a step of commonly holding authentication information in both the user and the network access entity if the initial authentication achieves success, and a step of executing a re-authentication using the commonly held authentication information without using the IC card when the user communicates again with the same network access entity within a predetermined period of time after the last authentication.

10 Claims, 13 Drawing Sheets

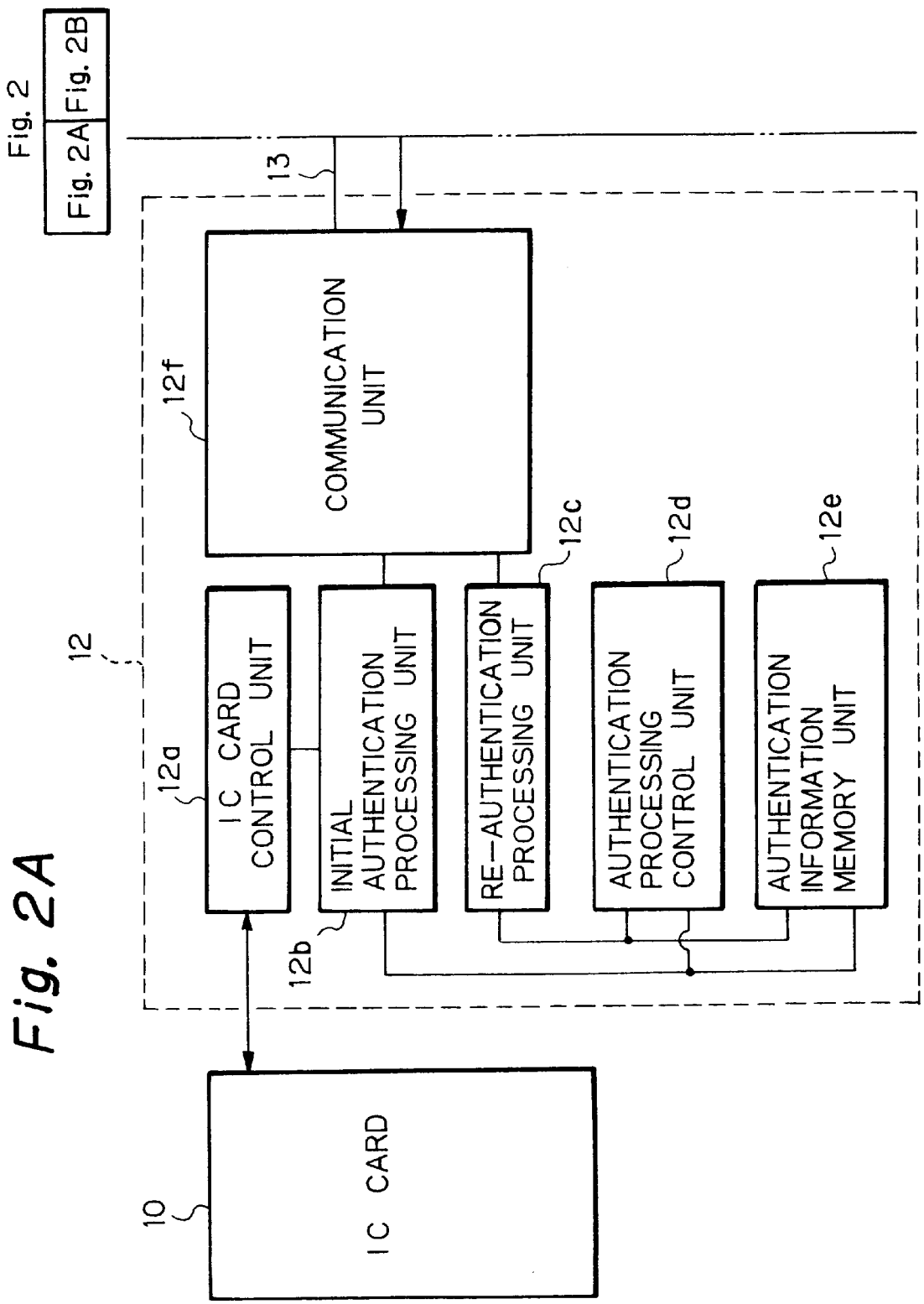

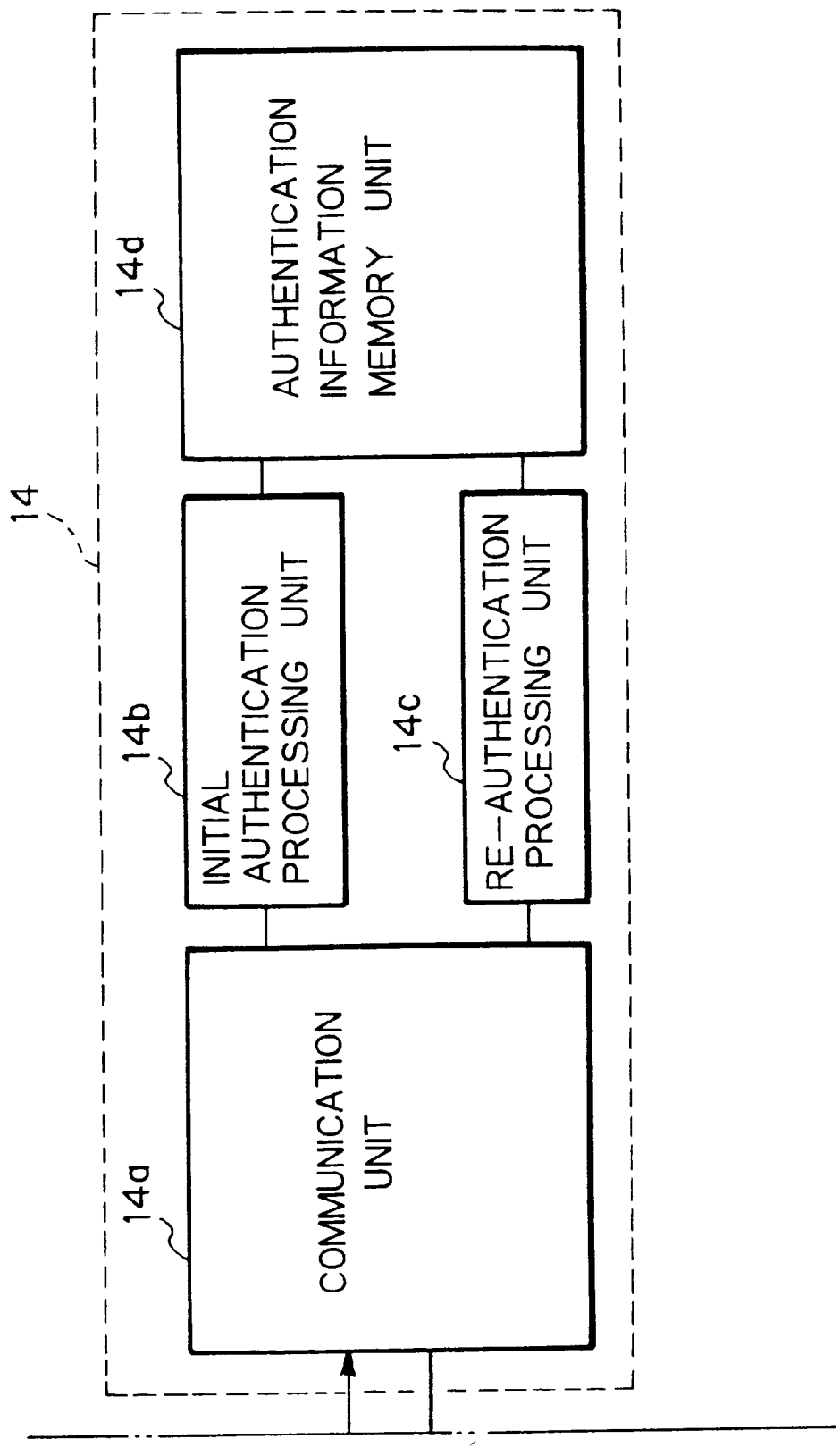

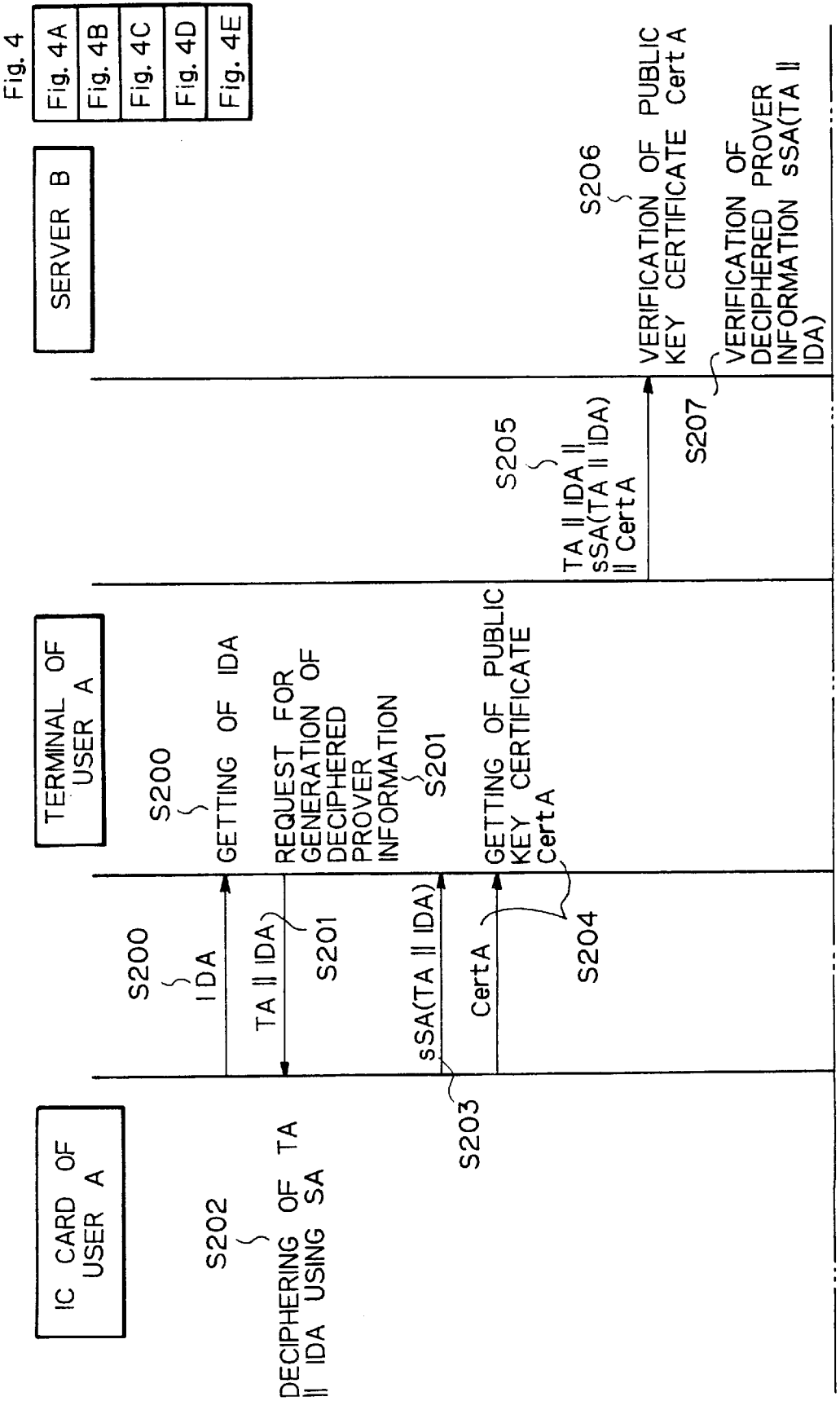

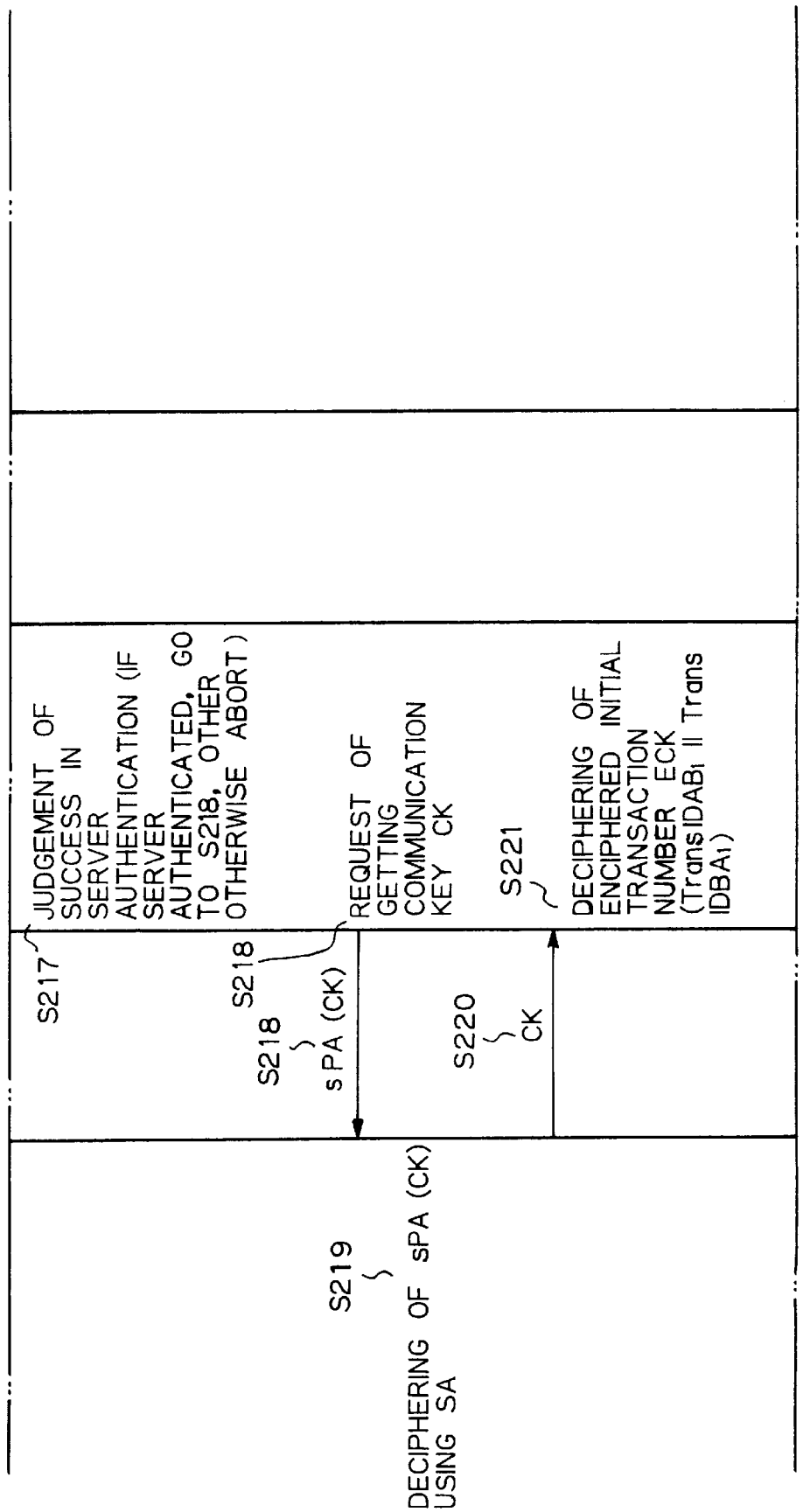

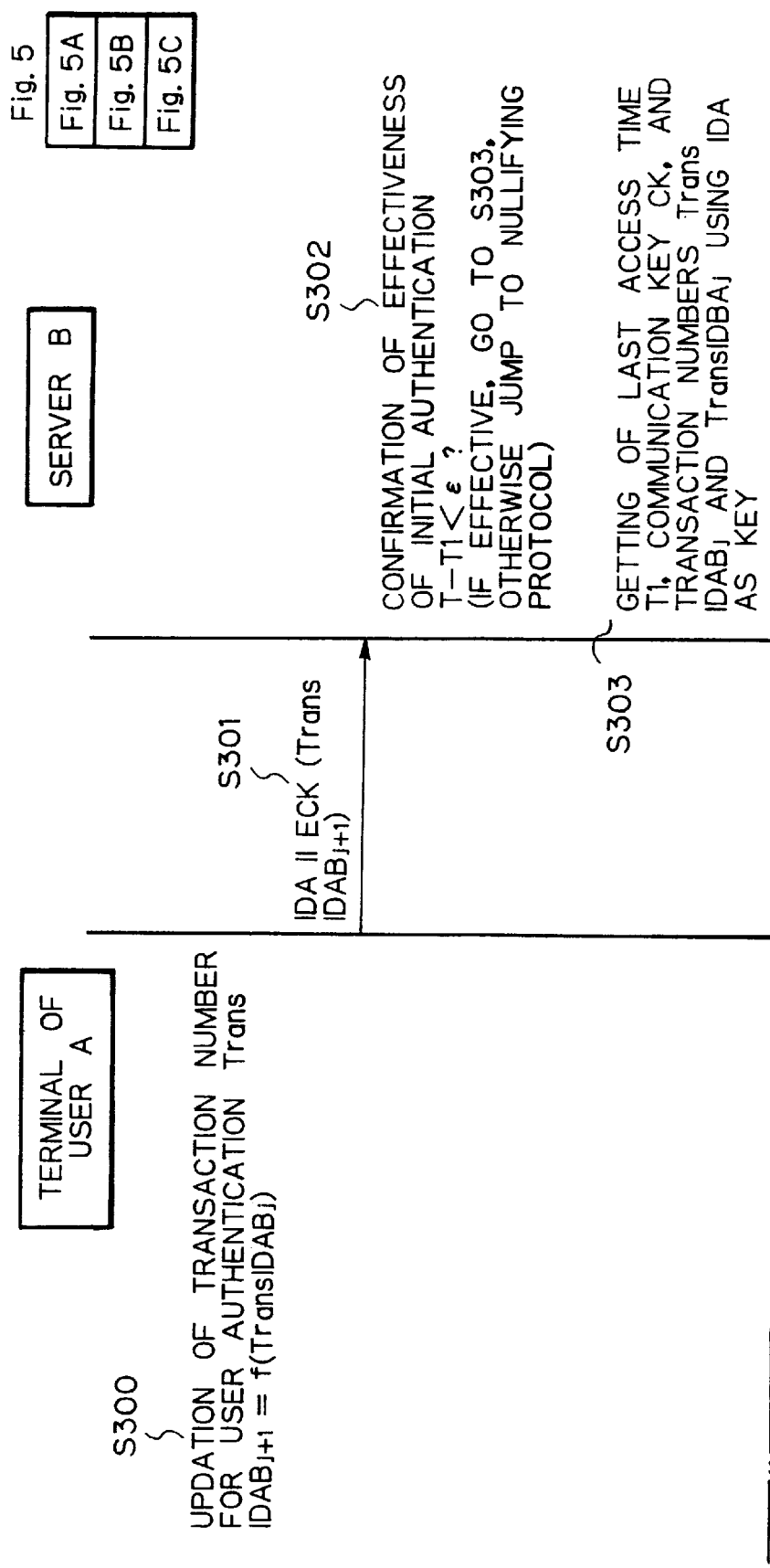

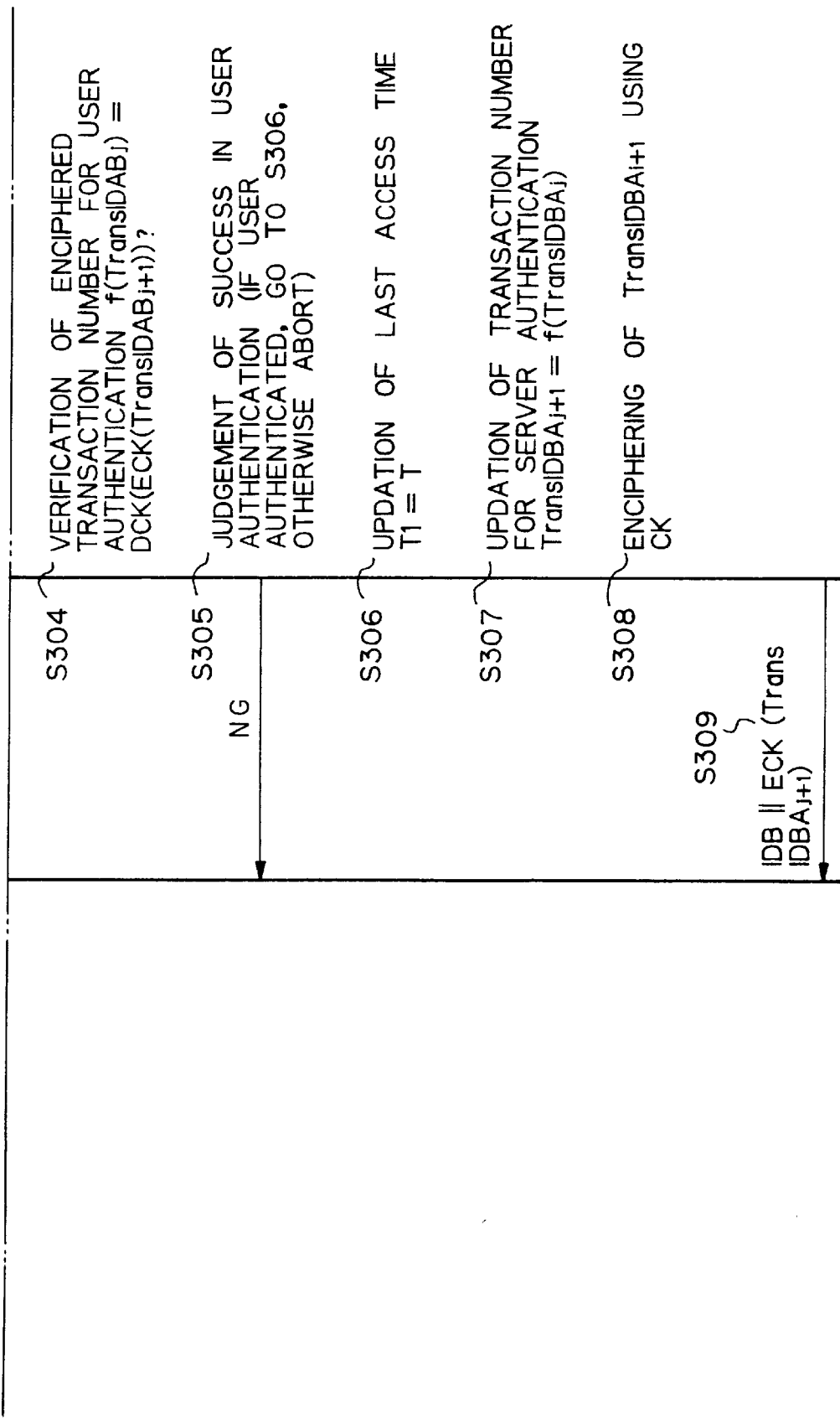

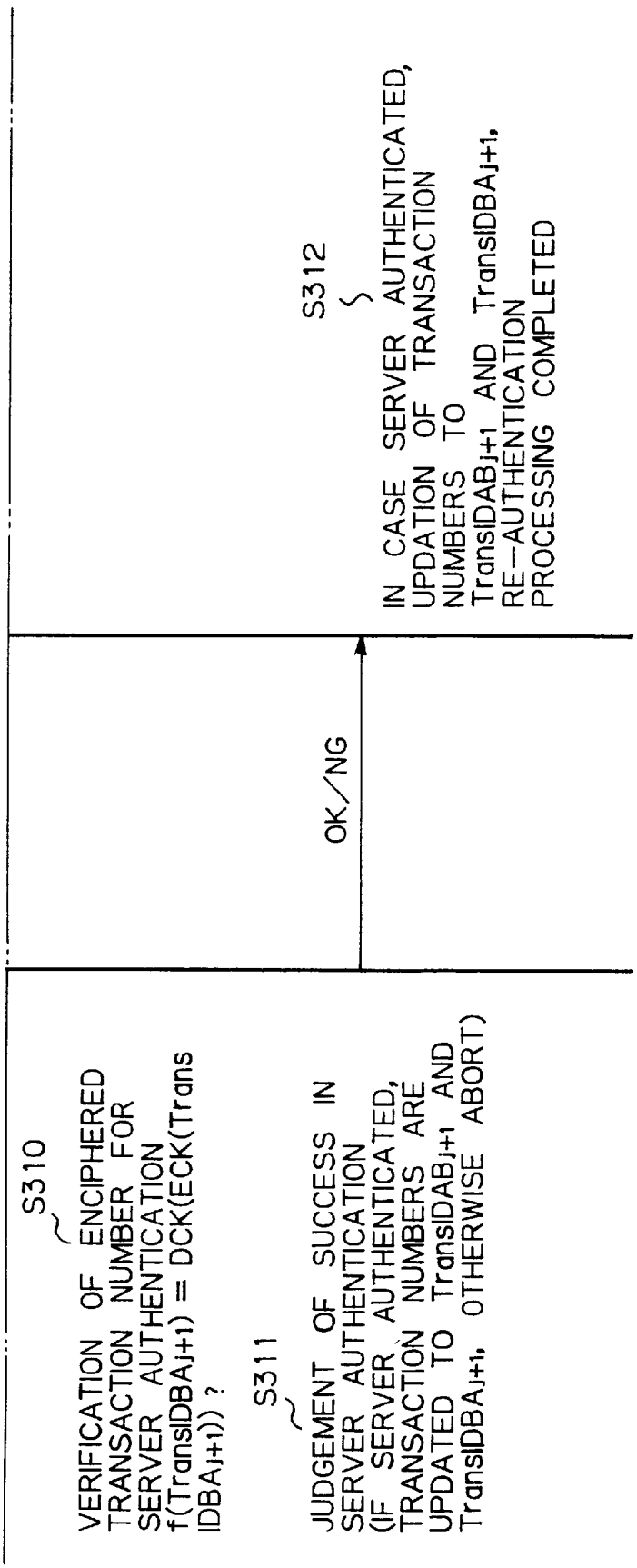

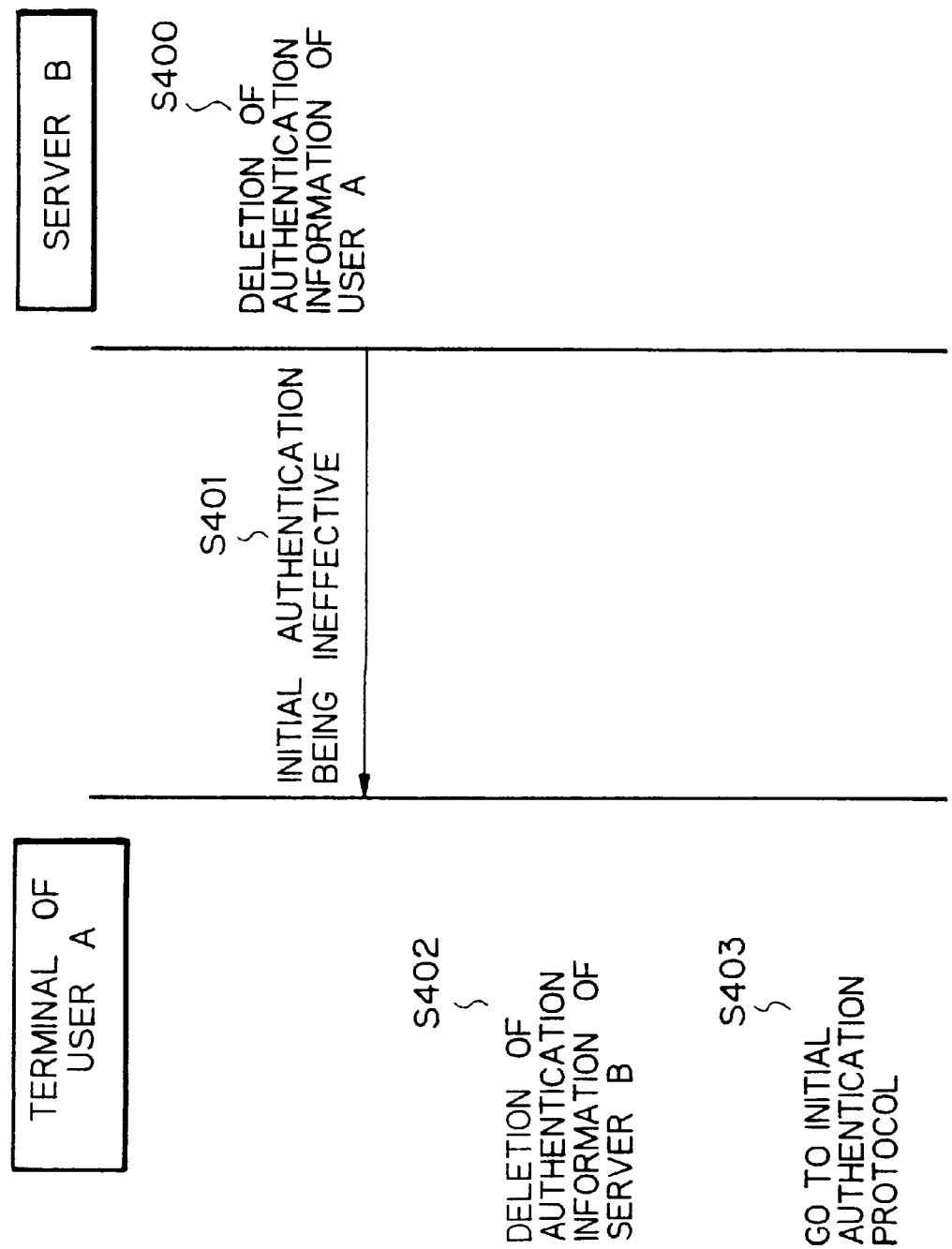

AUTHENTICATION METHOD AND SYSTEM USING IC CARD

FIELD OF THE INVENTION

The present invention relates to a method and system for authenticating network access entities using an IC card or smart card which contains an IC chip with a microprocessor, memories and arithmetic functions. Particularly, the present invention relates to an authentication method and system in a client/server communication configuration in which a plurality of clients (users) communicate with one or more servers located far from the clients.

DESCRIPTION OF THE RELATED ART

In the communication configuration such as WWW (World Wide Web) of Internet, before a user or client communicates with a server, mutual authentication is first executed to confirm legitimation of the user and the server with each other. In such mutual authentication, it is very effective to use an IC card with the microprocessor in order to increase user's convenience and security.

The mutual authentication using the IC card is in general executed by verifying, at each establishment of connection, user authentication information calculated in the IC card and provided to an application server to achieve user authentication, and by verifying server authentication information calculated in the application server and provided to the IC card or the user terminal to achieve server authentication. Thus, legitimation of the user and the server are confirmed with each other to prevent illegal connection from a third party.

In the connectionless type communication such as the Internet communication or in the transaction processing in which a job accompanies with establishment/release of a plurality of connections, it is necessary to frequently confirm authentication. Namely, in the former connectionless type communication, the authentication using an IC card will be requested each time information is received and/or transmitted, whereas in the latter transaction processing, the authentication using an IC card will be also requested every time connection is established.

However, the IC card needs a relatively long time (several seconds) for operation from a time when the user terminal connected with this IC card requests a calculation to a time when the user terminal receives the calculation result from the IC card. Thus, if the authentication using the IC card is executed many times at close intervals, it will take extremely long time for authentication process.

SUMMARY OF THE INVENTION

It is therefore an object of the present invention to provide a method and system for authenticating between network access entities using an IC card, whereby a high speed or good response authentication with keeping security can be provided.

According to the present invention, a method of authenticating between a user or client and a network access entity such as a server or another client using an IC card is provided. This method includes a step of executing an initial authentication using the IC card when the user first communicates with the network access entity, a step of commonly holding authentication information in both the user and the network access entity if the initial authentication achieves success, and a step of executing a re-authentication using the commonly held authentication information without using the IC card when the user communicates again with the same network access entity within a predetermined period of time after the last authentication.

Also, according to the present invention, a system for authenticating between a user or client and a network access entity such as a server or another client using an IC card is provided. The system includes a unit for executing an initial authentication using the IC card when the user first communicates with the network access entity, a unit for commonly holding authentication information in both the user and the network access entity if the initial authentication achieves success, and a unit for executing a re-authentication using the commonly held authentication information without using the IC card when the user communicates again with the same network access entity within a predetermined period of time after the last authentication.

After the user once executed a successful authentication with the network access entity using the IC card, when the user communicates again with the same network access entity within a predetermined period of time after the last authentication, no calculation in the IC card is carried out for authentication but the calculation is executed within a user terminal. Thus, according to the present invention, an extremely effective and high speed authentication can be realized.

Also, since the authentication information which is the result of the initial authentication and is commonly stored in both the user and the network access entity are used for the re-authentication, no additional authentication information will be necessary to be preliminarily and commonly held in the user and the server before the authentication. Thus, the authentication method and system according to the present invention can be easily used in a wide area network.

It is preferred that the initial authentication is an authentication using a public key cryptographic technique, and the re-authentication is an authentication using a secret key cryptographic technique.

It is also preferred that the initial authentication is executed when the user has not the authentication information, and the re-authentication is executed when the user has the authentication information.

It is preferred that the initial authentication is executed instead of the re-authentication when the predetermined period of time has passed after the last authentication.

Preferably, the authentication information is encrypted and the encrypted authentication information is sent between the user and the network access entity.

Also, prefer ably, the authentication information is updated to have different values at each time and the updated authentication information is sent between the user and the network access entity.

Further objects and advantages of the present invention will be apparent from the following description of the preferred embodiments of the invention as illustrated in the accompanying drawings.

BRIEF DESCRIPTION OF THE DRAWINGS

FIG. 2, which is combined by FIGS. 2A and 2B, is a block diagram schematically illustrating a circuitry configuration of the authentication system shown in FIG. 1;

FIG. 5, which is combined by FIGS. 5A to 5C, is a flow chart illustrating a re-authentication protocol in accordance with the embodiment shown in FIG. 1; and FIG. 6 is a flow chart Illustrating a nullifying processing protocol in accordance with the embodiment shown in FIG. 1.

DESCRIPTION OF THE PREFERRED EMBODIMENTS

Figure 1:
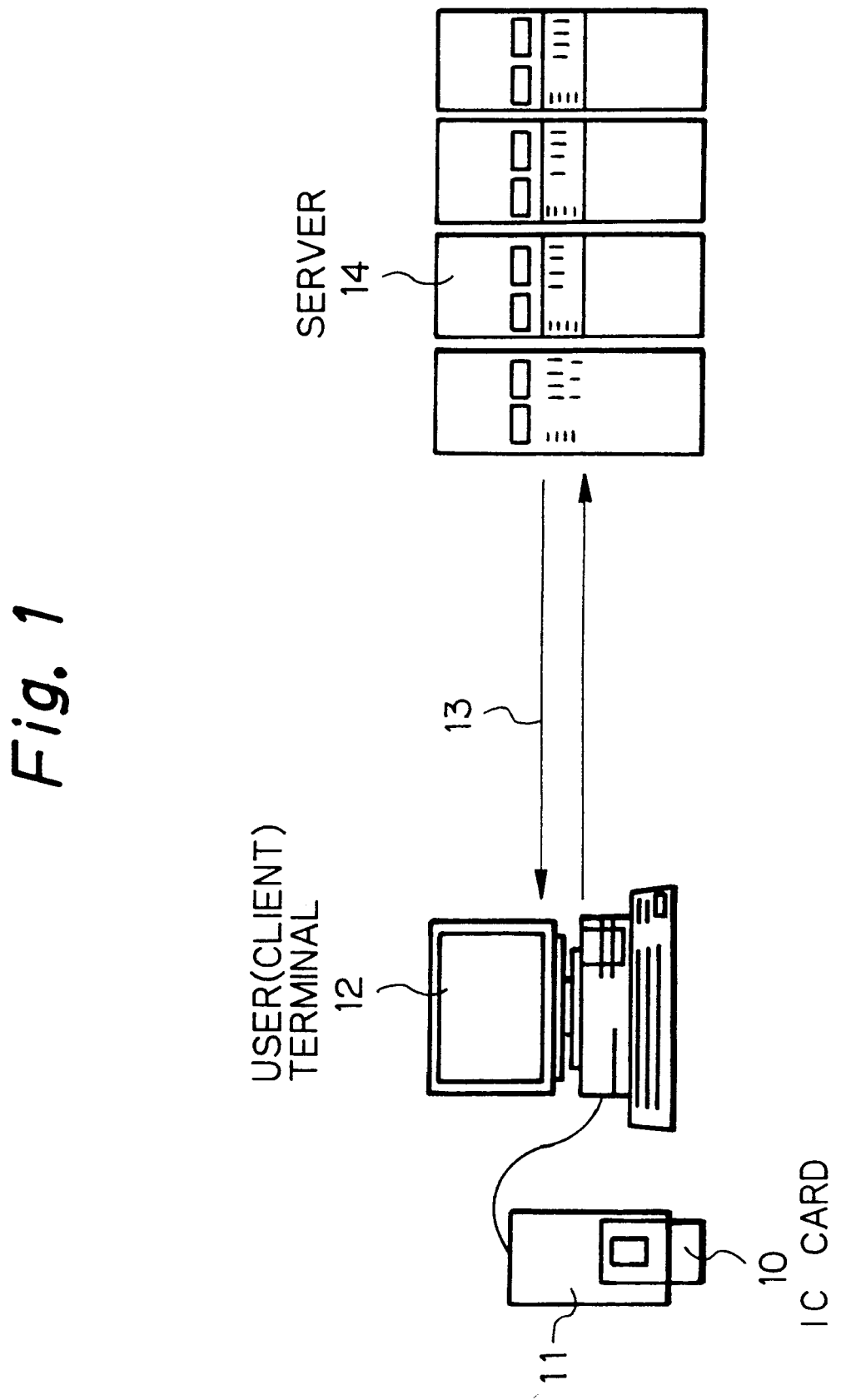
FIG. 1 illustrates a simple configuration of a preferred embodiment of an authentication system using an IC card according to the present invention.

In FIG. 1 which schematically illustrates the simplest configuration of the preferred embodiment of the authentication system according to the present invention, reference numeral 10 denotes an IC card or smart card of a user or client, which card contains an IC chip with a microprocessor, memories and arithmetic functions, and 11 denotes a card reader/writer for the IC card. The card reader/writer 11 is connected to a terminal 12 of a user or client. This user terminal 12 can be connected to an application server 14 via a communication line 13.

FIG. 2 schematically illustrates the circuitry configuration of the authentication system shown in FIG. 1. As shown in this figure, the user terminal 12 is provided with an IC card control unit 12a for controlling operation of the IC card 10 inserted in the reader/writer 11, an initial authentication processing unit 12b for executing an initial authentication or first authentication protocol, a re-authentication processing unit 12c for executing a re-authentication or second authentication protocol, the authentication processing control unit 12d for judging which of the initial authentication processing unit 12b or the re-authentication processing unit 12c is to be accessed, an authentication information memory unit 12e for storing authentication information with respect to respective communication partners (servers), and a communication unit 12f.

The application server 14 is provided with a communication unit 14a, an initial authentication processing unit 14b for executing an initial authentication or first authentication protocol, a re-authentication processing unit 14c for executing a re-authentication or second authentication protocol, and an authentication information memory unit 14d for storing authentication information with respect to respective user or client terminals.

Figure 3:
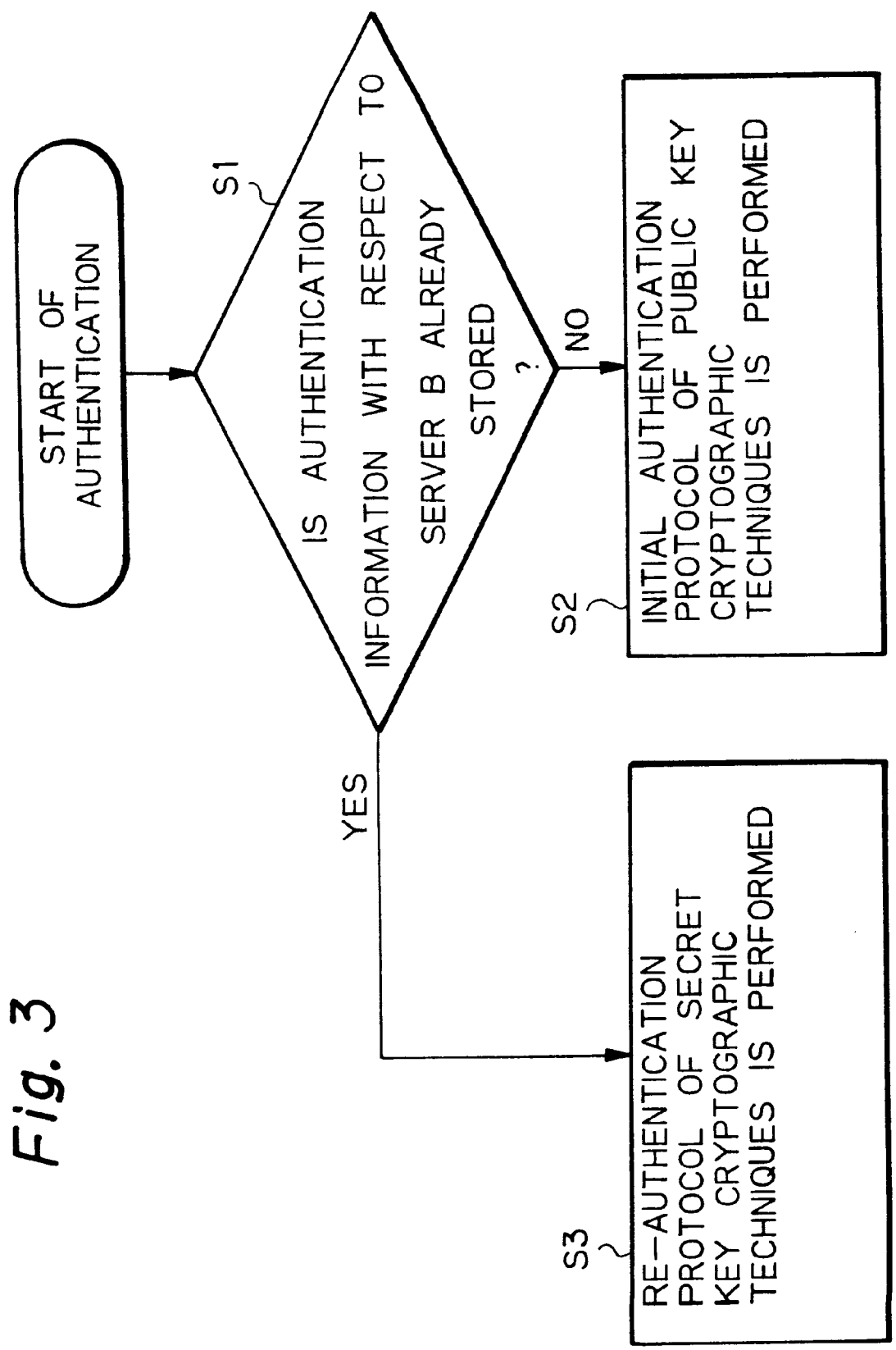
FIG. 3 is a flow chart illustrating a process control protocol of an authentication processing control unit in a user terminal shown in FIG. 1.

FIG. 3 illustrates the process control protocol of the authentication processing control unit 12d in the user terminal 12. In the connectionless type communication such as the Internet communication or in the transaction processing in which a job accompanies with establishment/release of a plurality of connections, each time information is received and/or transmitted or each time connection is established, an authentication processing from the terminal of the user A, illustrated in FIG. 3, starts. Alternately, the authentication processing may be started from the server B.

First, at step S1, it is Judged whether authentication information between the user A and its communication partner (server) B is already stored in the memory unit 12e in the terminal 12 of the user A or not. As will be described later, the memory unit 12e in the user terminal 12 will have the authentication information with respect to the server B (communication key CK, transaction numbers $TransIDAB_j$ and $TransIDBA_j$) together with its identity (ID) if an initial mutual authentication between the user A and the server B has achieved success.

If no authentication information is stored in the memory unit 12e, it is judged that this is an initial authentication processing (including a case where a predetermined period of time has passed after the last authentication) and thus the initial authentication protocol using a public key cryptographic techniques is performed at step S2. Contrary to this, if the memory unit 12e has an authentication information with respect to the server B, the re-authentication protocol using a secret key cryptographic techniques is performed at step S3.

Figure 4B:
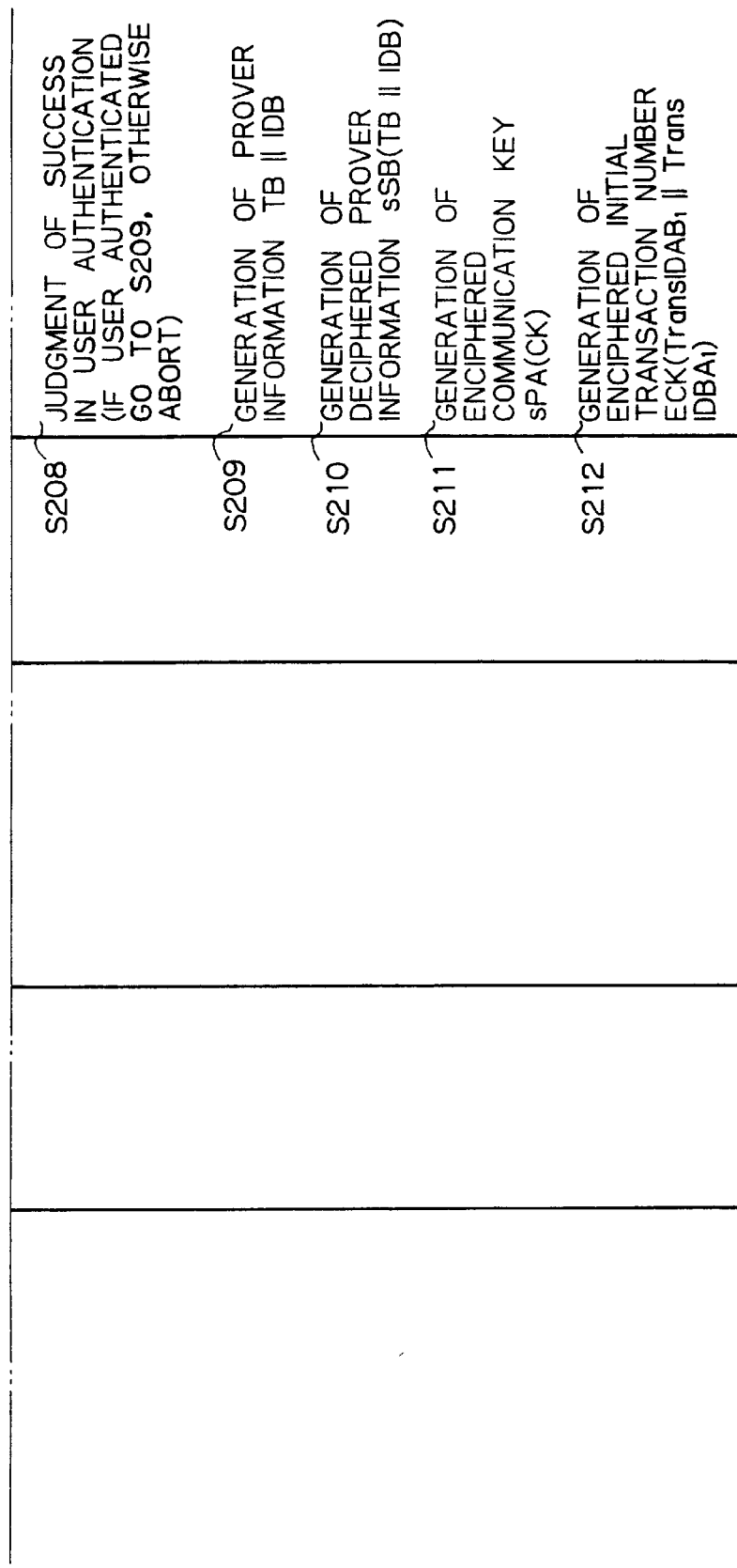
FIG. 4, which is combined by FIGS. 4A to 4E, is a flow chart illustrating an initial authentication protocol in accordance with the embodiment shown in FIG. 1.
Figure 4C:
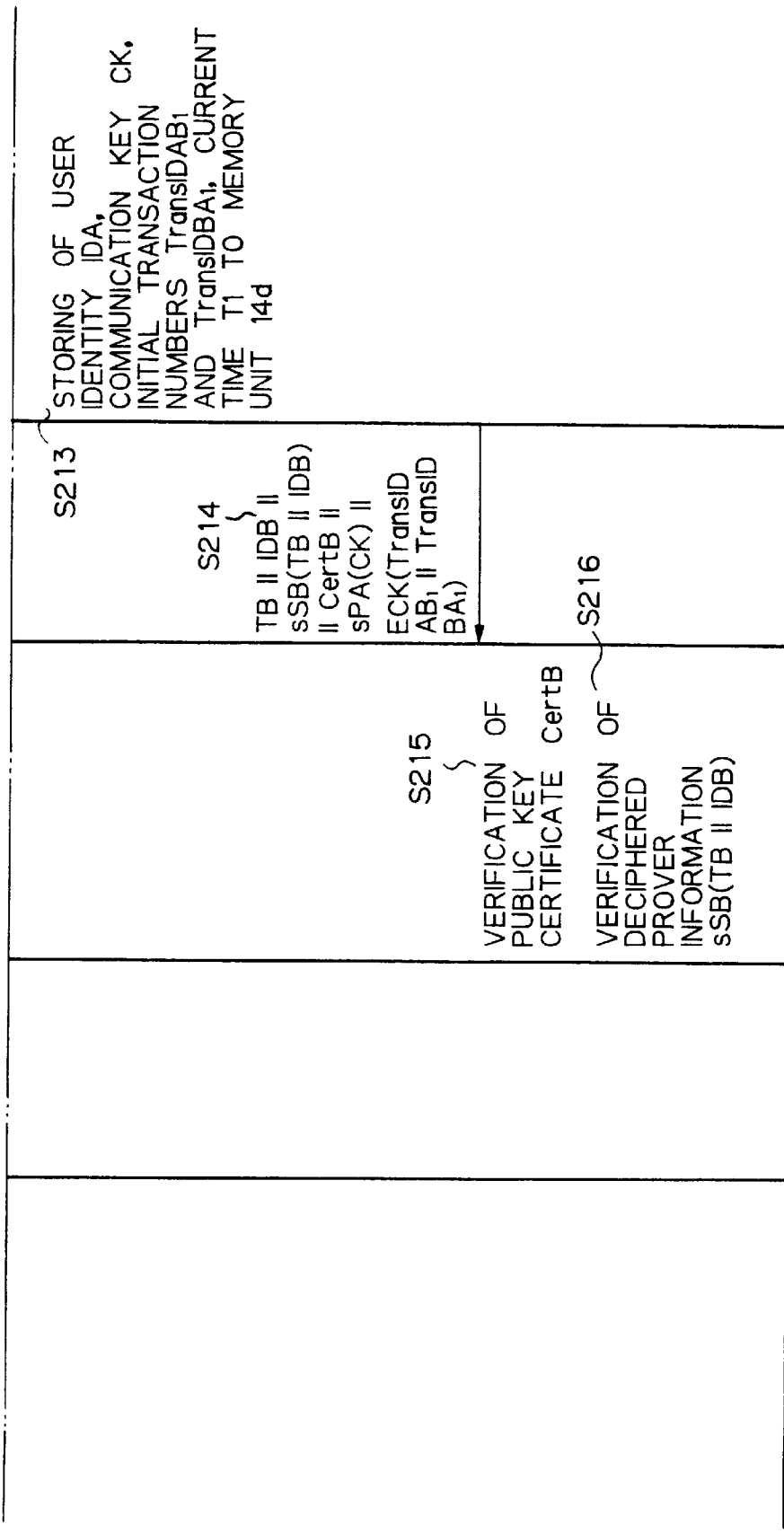
Figure 4E:
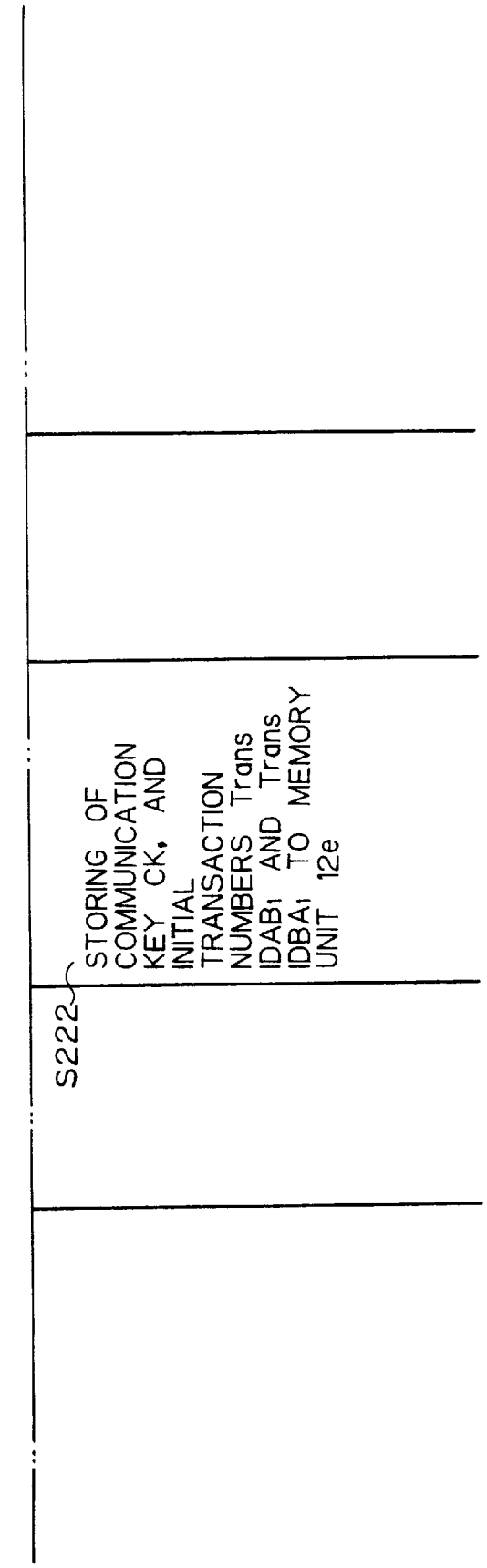

FIG. 4 illustrates flow of the initial authentication protocol making the use of the public key cryptographic techniques. The following is operations of the initial authentication processing units 12b and 14b in the terminal 12 of the user A and the server B, respectively.

First, at step S200, the terminal 12 of the user A gets an identity IDA of this card user A from the IC card 10. In the IC card 10, a public key certificate CertA of the user A and a secret key SA (for the public key cryptography) of the user A have already been stored other than the identity IDA of the user A. As is well known, the public key certificate is information for certificating a user's public key by a certification authority, in other words, is information which can verify legitimation of the public key PA of the user A, for example.

At the next step S201, the user terminal 12 requests for generation of a deciphered prover information to the IC card 10. This request is performed by obtaining current time information TA from the terminal itself, combining this TA with the user identity IDA to generate a prover information TA‖IDA, and sending the generated prover information TA‖IDA to the microprocessor in the IC card 10.

At step S202, the IC card 10 deciphers the prover information sent from the terminal 12 in accordance with the public key cryptography using the secret key SA of the user A. The deciphered result SSA(TA‖IDA) is sent to the terminal 12 at step S203.

Then, at step S204, the user terminal 12 gets the public key certificate CertA of the user A from the IC card 10. At step S205, the prover information TA‖IDA, the deciphered prover information sSA(TA‖IDA) and the public key certificate CertA are combined, and then the combined result TA‖IDA‖sSA(TA‖IDA)‖CertA is sent to the server B.

Then, the server (verifier) B verifies legitimation of the public key certificate CertA of the user A, and obtains the public key PA of this user A, at step S206. At the next step S207, the server B verifies the deciphered prover information sSA(TA‖IDA). Namely, at the step S207, the server B enciphers the deciphered prover information sSA(TA‖IDA) using the public key PA of the user A, and compares the enciphered result sPA(sSA(TA‖IDA)) with the prover information TA‖IDA sent from the user terminal 12.

At step S208, it is judged whether the user (prover) A is successfully authenticated by the server B or not, in accordance with the result of the comparison. Namely, if the both results coincide with each other, the user is authenticated and therefore the server authentication processing is started from step S209. Otherwise, it is judged that the connection request from an illegal user occurs and thus the process is aborted.

At step S209, the server B obtains current time information TB, and then combines this TB with a server identity IDB to generate a prover information TB‖IDB.

At step S210, the server B deciphers the prover information TB‖IDB in accordance with the public key cryptography using the secret key SB of the server B to generate a deciphered result sSB(TB‖IDB).

At step S211, the server B generates a communication key CK based upon random number information, and then enciphers the generated communication key CK using the public key PA of the user A. Thus, enciphered communication key sPA(CK) is obtained.

At the next step S212, the server B generates two kinds of initial transaction numbers which will be used in a re-authentication or second authentication processing described later, namely generates an initial transaction number TransIDAB$_1$ used for authenticating the user A and an initial transaction number TransIDBA$_1$ used for authenticating the server B. Thereafter, the server B combines the generated transaction numbers and then enciphers the combined result using the communication key CK to produce an enciphered initial transaction number ECK (TransIDAB$\|$TransIDBA$_1$).

Then, at step S213, the server B stores the identity IDA of the communication partner (user A) who is authenticated by this server B, the communication key CK, the transaction numbers TransIDAB$_j$ and TransIDBA$_j$ (j=1,2,3,. . .) which will be in this first case the initial transaction numbers TransIDAB$_1$ and TransIDBA$_1$ and the current time T1 into the memory unit 14d. The server B stores authentication information (identities, communication keys, transaction numbers for user authentication, transaction numbers for server authentication, and last access time) for respective users in the memory unit 14d as shown in Table 1 and manages them. In Table 1, CK$_A$ (=CK) and CK$_C$ indicate communication keys of the users A and C, TransIDBC$_j$ and TransIDCB$_j$ indicate transaction numbers used in the authentication with the user C, and T1$_A$ (=T1) and T1$_C$ indicate the last access times used in the authentication with the users A and C, respectively.

TABLE 1

| User ID | Communication key | Transaction no. for server authentication | Transaction no. for user authentication | Last access time |
|---|---|---|---|---|
| IDA | CK$_A$ | TransIDBA$_j$ | TransIDAB$_j$ | T1$_A$ |
| IDC | CK$_C$ | TransIDBC$_j$ | TransIDCB$_j$ | T1$_C$ |

At step S214, the server B combines the prover information TB$\|$IDB, the deciphered result thereof sSB(TB$\|$IDB), the public key certificate of the server B CertB, the enciphered communication key sPa(CK) and the enciphered initial transaction number ECK(TransIDAB$_1\|$TransIDBA$_1$), and sends the combined result to the terminal of the user A.

The terminal of the user (verifier) A verifies legitimation of the public key certificate CertB of the server B, and obtains the public key PB of this server B, at step S215. At the next step S216, the terminal of the user A verifies the deciphered prover information sSB(TB$\|$IDB). Namely, at the step S216, the user terminal enciphers the deciphered prover information sSB(TB$\|$IDB) using the public key PB of the server B, and compares the enciphered result sPB(sSB (TB$\|$IDB)) with the prover information TB$\|$IDB sent from the server B.

At step S217, it is judged whether the server (prover) B is successfully authenticated by the user A or not, in accordance with the result of the comparison. Namely, if the both results coincide with each other, the server is authenticated and therefore the process at the next step S218 is executed. Otherwise, it is judged that the connection request from an illegal user occurs and thus the process is aborted.

At the next step S218 which will be executed after both the user A and the server B are authenticated with each other, the terminal 12 of the user A requests the IC card 10 to provide a communication key. In fact, the terminal 12 sends the enciphered communication key sPA(CK) to the IC card 10.

Thus, the IC card 10 deciphers the enciphered communication key SPA(CK) from the terminal 12 using the secret key SA of the user A which has been stored in the IC card 10 to produce a communication key CK, at step S219. The produced communication key CK is sent to the terminal 12 at step S220.

At the next step S221, the terminal 12 deciphers the enciphered initial transaction number ECK (TransIDAB$_1\|$TransIDBA$_1$) using the received communication key CK to produce the initial transaction numbers TransIDAB$_1$ and TransIDBA$_1$.

Then, at step S222, the terminal 12 stores the identity IDB of the communication partner (server B) with whom mutual authentication has been executed, the communication key CK, and the transaction numbers TransIDAB$_j$ and TransIDBA$_j$ (j=1,2,3, . . .) which will be in this first case the initial transaction numbers TransIDAB$_1$ and TransIDBA$_1$ into the memory unit 12e of this terminal 12. The terminal 12 stores authentication information (identities, communication keys, transaction numbers for user authentication, and transaction numbers for server authentication) for respective servers in the memory unit 12e as shown in Table 2 and manages them. In Table 2, IDD indicates an identity of a server D, CK$_B$ (=CK) and CK$_D$ indicate communication keys of the servers B and D, and TransIDDA$_j$ and TransIDAD$_j$ indicate transaction numbers used in the authentication with the server DC, respectively.

TABLE 2

| User ID | Communication key | Transaction no. for server authentication | Transaction no. for user authentication |
|---|---|---|---|
| IDB | CK$_B$ | TransIDBA$_j$ | TransIDAB$_j$ |
| IDD | CK$_D$ | TransIDDA$_j$ | TransIDAD$_j$ |

With the above-mentioned processes, the initial authentication is completed.

FIG. 5 illustrates flow of the re-authentication protocol making the use of the secret key cryptographic techniques.

In this embodiment, the re-authentication or second authentication represents an authentication when the user A intends to be connected again with the same server B after the user A and the server B once mutually authenticated with each other using the IC card. In the re-authentication, an mutual authentication is executed by using two kinds of transaction numbers TransIDAB$_j$ and TransIDBA$_j$ (j=1, 2, 3, . . . ) which are provided in both the user A and the server B. Namely, as aforementioned, after the initial authentication is executed, the user A holds the identity rDB of the server B, the communication key CK and the transaction numbers TransIDAB$_j$ and TransIDBA$_j$ in the memory unit 12e, whereas the server B holds the identity IDA of the user A, the communication key CK, the transaction numbers TransIDAB$_j$ and TransIDBA$_j$ and the last access time T1 in the memory unit 14d.

The encryption method used in the re-authentication processing is the secret (common) key cryptographic techniques which is capable of high speed processing. The following is operations of the re-authentication processing units 12c and 14c in the user terminal 12 of the user A and the server B when the user A and the server B are connected at jth round after the initial authentication, respectively.

First, at step S300, the terminal 12 of the user A updates the transaction number for user authentication. Namely, TransIDAB$_j$ is updated to a next order's transaction number using a private function f. The server B is also provided with this function f. The function f is preferably a private function for confidentiality, but public function can be utilized as for the function f. The above-mentioned updation will be represented as TransIDAB$_{j+1}$=f(TransIDAB$_j$).

The updated transaction number TransIDAB$_{j+1}$ is enciphered using the communication key CK, and the enciphered transaction number ECK(TransIDAB$_{j+1}$) is combined with the identity IDA of the user A at the user terminal 12. Then, the combined result is sent to the server B at step S301.

At step S302, the server B confirms whether the initial authentication is effective in this re-authentication or not, namely whether this re-authentication is executed within an effective period of time or not. To put it concretely, the server B derives the last access time T1 (=T1$_A$) of the user A from the memory unit 14d and compares it with the current time T. If T-T1 is shorter than a predetermined time $\epsilon$, it is judged that the initial authentication is effective and the successive processing of the re-authentication is continued. If T-T1 is equal to or longer than the predetermined time $\epsilon$, it is judged that the initial authentication is invalid and a nullifying protocol shown in FIG. 6 is executed.

At the next step S303, the server B searches its memory unit 14d using the identity IDA of the user A as a search key, to get the communication key CK, the transaction number for user authentication TransIDAB$_j$ and the transaction number for server authentication TransIDBA$_j$.

Then, at step S304, the server B verifies the received, enciphered transaction number for user authentication ECK (TransIDAB$_{j+1}$). Namely, the server B deciphers the enciphered transaction number for user authentication ECK (TransIDABj$_{j+1}$) using the obtained communication key CK to produce DCK(ECK(TransIDAB$_{j+1}$)), and then updates the transaction number for user authentication TransIDAB$_j$ stored in the memory unit 14d to a next order's transaction number using the private function f. This updation is represented as TransIDAB$_{j++1}$=f(TransIDAB$_j$). Thereafter, the this updated transaction number TransIDAB$_{j+1}$ is compared with the deciphered authentication number DCK(ECK (TransIDAB$_{j+1}$)).

At step S305, it is judged whether the user (prover) A is successfully authenticated by the server B or not, in accordance with the result of the comparison. Namely, if the both results coincide with each other, the user is authenticated and therefore the server authentication processing is started from step S306. Otherwise, it is judged that the connection request from an illegal user occurs and thus NG is sent to the terminal 12 of the user to abort the process.

At step S306, the server B updates the last access time T1 to the current time T. Then, at step S307, the server B updates the transaction number for server authentication TransIDBA$_j$ stored in the memory unit 14d to a next order's transaction number using the private function f. This updation is represented as TransIDBA$_{j+1}$=f(TransIDBA$_j$).

Thereafter, at step S308, the this updated transaction number TransIDBA$_{j+1}$ for server authentication is enciphered using the communication key CK. The enciphered transaction number ECK(TransIDBA$_{j+j+1}$) and the identity IDB of the server B are combined and sent to the terminal 12 of the user A, at step S309.

The terminal 12 of the user A verifies the received enciphered transaction number ECK(TransIDBA$_{j+1}$) for server authentication at step S310. Namely, the terminal of the user A searches its memory unit 12e using the identity IDB of the server B as a search key, to get the communication key CK and the transaction number for server authentication TransIDBA$_j$. Then, the user terminal deciphers the received enciphered transaction number for server authentication ECK(TransIDBA$_{j+1}$) using the obtained communication key CK to produce DCK(ECK(TransIDBA+$_{j+1}$)), and then updates the transaction number for server authentication TransIDBA$_j$ stored in the memory unit 12e to a next order's transaction number using the private function f. This updation is represented as TransIDBA$_{j+1}$=f(TransIDBA$_j$). Thereafter, the this updated transaction number TransIDBA$_{j+1}$ is compared with the deciphered authentication number DCK(ECK(TransIDBA$_{j+1}$)).

At step S'311, it is judged whether the server (prover) B is also successfully authenticated by the user A or not, in accordance with the result of the comparison. Namely, if the both results coincide with each other, the server is also authenticated and OK is sent to the server B, as well as the transaction numbers stored in the memory unit 12e are updated to TransIDAB$_{j+1}$ and TransIDBA$_{j+1}$, respectively. Otherwise, it is judged that the connection request from an illegal user occurs and thus NG is sent to the server B to abort the process.

At step S312, only when the server authentication is made success, namely only when the server receives OK from the user terminal 12, the server B updates the transaction numbers stored in the authentication information memory unit 14d to TransIDAB$_{j+1}$ and TransIDBA$_{j+1}$, respectively.

With the above-mentioned processes, the re-authentication is completed.

FIG. 6 illustrates the nullifying processing protocol described in the flow shown in FIG. 5.

At the step S302 of FIG. 5, if it is judged that the initial authentication is invalid, the server B deletes authentication information of the user A, namely, the communication key CK, the transaction numbers TransIDAB$_j$ and TransIDBA$_j$ and the last access time T1 which are stored in the memory unit 14d at step S400.

Then, at step S401, the server B informs to the user A that the initial authentication is now ineffective.

Thus, the user A deletes the authentication information with respect to the server B, namely the communication key CK and the transaction numbers TransIDAB$_j$ and TransIDBA$_j$, stored in the memory unit 12e, at step S402. Thereafter, at step S403, the initial authentication processing illustrated in FIG. 4 is started again.

As aforementioned, in the initial authentication, a strict authentication which can be used in a wide area network is executed in accordance with the public key cryptographic method using the IC card, while in the re-authentication, a high speed authentication is executed in accordance with the secret key cryptographic method by means of a software without using the IC card. Therefore, according to the present invention, an extremely effective and high speed authentication can be realized.

Also, since the transaction IDs and the communication key which is the result of the initial authentication and is commonly stored in both the user and the server are used for the re-authentication, no authentication information will be necessary to be preliminarily and commonly held in the user and the server before the authentication processing. Thus, the authentication method according to the present invention can be easily used in a wide area network.

Furthermore, according to the present invention, since both the initial authentication and re-authentication are executed, the security can be improved. In addition, according to the present invention, since the transaction ID used in the re-authentication is enciphered and also updated to have different value at each time, possible impersonation attacks and/or replay attacks can be effectively prevented resulting extremely high security. If a private function is used for the function of updating the transaction ID, the security can be further increased.

In the aforementioned initial authentication, the public key cryptographic method is utilized. However, another cryptographic methods other than public key cryptography can be used at penalties in wide area network characteristics. Furthermore, in the aforementioned embodiment, mutual authentications are executed in both the initial authentication and the re-authentication. However, the initial authentication and/or the re-authentication according to the present invention may be achieved by either the user authentication or the server authentication.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of authenticating between a user and a network access entity using an IC card, comprising the steps of:

executing an initial authentication using the IC card when the user first communicates with the network access entity;

commonly holding authentication information in both the user and the network access entity if the initial authentication achieves success; and executing a re-authentication using said commonly held authentication information without using the IC card when the user communicates again with the same network access entity within a predetermined period of time after the last authentication, wherein said initial authentication is an authentication using a public key cryptographic technique, and wherein said re-authentication is an authentication using a secret key cryptographic technique.

2. The method as claimed in claim 1, wherein said initial authentication is executed when the user has no previous authentication information in said network access entity, and said re-authentication is executed when the user has said previous authentication information in said network access entity.

3. The method as claimed in claim 1, wherein said initial authentication is executed instead of the re-authentication when the predetermined period of time has passed after the last authentication.

4. The method as claimed in claim 1, wherein said authentication information is encrypted and the encrypted authentication information is sent between the user and the network access entity.

5. The method as claimed in claim 1, wherein said authentication information is updated to have different values at each time and the updated authentication information is sent between the user and the network access entity.

6. A system for authenticating between a user and a network access entity using an IC card, comprising:

means for executing an initial authentication using the IC card when the user first communicates with the network access entity;

means for commonly holding authentication information in both the user and the network access entity if the initial authentication achieves success; and means for executing a re-authentication using said commonly held authentication information without using the IC card when the user communicates again with the same network access entity within a predetermined period of time after the last authentication, wherein said initial authentication is an authentication using a public key cryptographic technique, and wherein said re-authentication is an authentication using a secret key cryptographic technique.

7. The method as claimed in claim 6, wherein said initial authentication is executed when the user has no previous authentication information in said network access entity, and said re-authentication is executed when the user has said previous authentication information in said network access entity.

8. The system as claimed in claim 6, wherein said initial authentication is executed instead of the re-authentication when the predetermined period of time has passed after the last authentication.

9. The system as claimed in claim 6, wherein said authentication information is encrypted and the encrypted authentication information is sent between the user and the network access entity.

10. The system as claimed in claim 6, wherein said authentication information is updated to have different values at each time and the updated authentication information is sent between the user and the network access entity.

* * * * *